No. 741,409. PATENTED OCT. 13, 1903.
O. OINES.
CLOTHES POUNDER.
APPLICATION FILED MAR. 30, 1903.
NO MODEL.
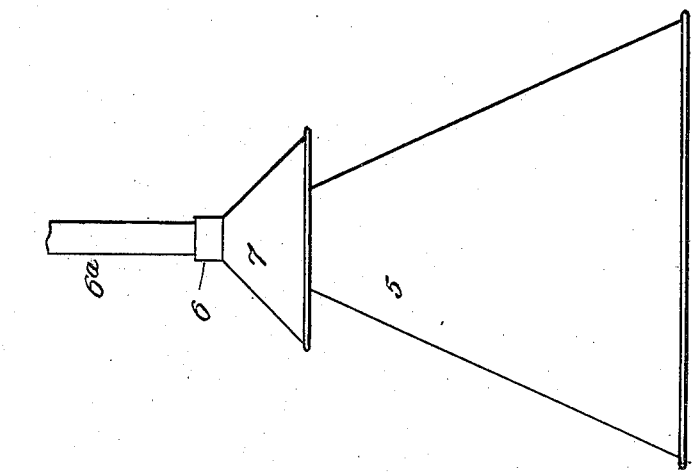
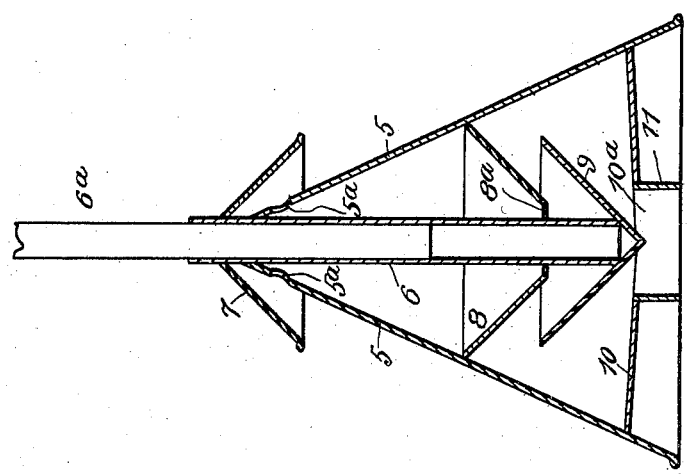
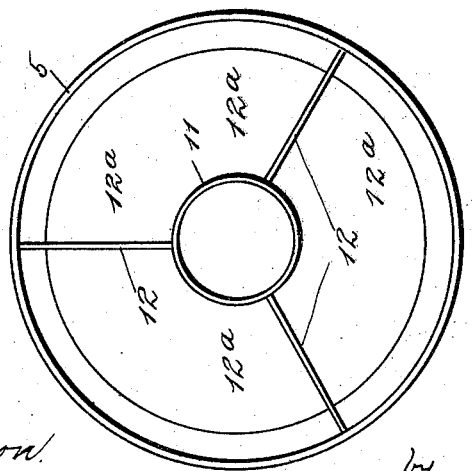
Witnesses
Inventor
Ole Oines No. 741,409. Patented October 13, 1903.

UNITED STATES PATENT OFFICE.

OLE OINES, OF VOLGA, SOUTH DAKOTA.

CLOTHES-POUNDER.

SPECIFICATION forming part of Letters Patent No. 741,409, dated October 13, 1903.

Application filed March 30, 1903. Serial No. 150,181. (No model.)

*To all whom it may concern:*

Be it known that I, OLE OINES, a citizen of the United States, residing at Volga, in the county of Brookings and State of South Dakota, have invented certain new and useful Improvements in Clothes-Pounders; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to clothes-pounders, and has for its object an improved article of this kind which shall be thoroughly efficient in operation.

With this and other objects in view the invention comprises a novel arrangement and combination of parts hereinafter described, and pointed out in the claim.

In the accompanying drawings, Figure 1 is an elevation of my invention. Fig. 2 is a vertical section, and Fig. 3 is a bottom plan view thereof.

Referring specifically to the drawings, 5 indicates the outer conical hood, having a socket 6 for the operating-handle $6^a$. The upper part of the hood has openings $5^a$. A conical shield 7 is secured to the socket 6 over these openings, which prevents the water from squirting upward when the device is operated. Within the hood and below the openings $5^a$ I form an inverted conical partition 8, having an annular opening $8^a$ around the socket. Below the opening is an inverted conical shield 9, which is attached to and serves to close the lower end of the socket 6. This shield and the partition 8 form a tortuous passage for the air and water.

The hood 5 has a lower partition 10 secured therein a short distance above the bottom, and has a central opening $10^a$ and a depending tube 11 therefrom, through which air and water may pass into the hood. The lower end of the tube is substantially flush with the bottom of the hood. Radial partitions 12 extend from the tube to the hood, forming chambers or compartments $12^a$.

The arrangements of parts as specified produce an effective suction when in use and well serve the purpose of the device.

Having thus described my invention, what is claimed as new, and desired to be secured by Letters Patent, is—

A clothes-pounder comprising a conical hood having openings near the top thereof, and a handle-socket extending within the hood, a shield over said openings, an inverted conical shield closing the lower end of the handle-socket, a partition above said shield having an annular opening around the socket, a bottom partition in the hood below the handle-socket, a central vertical tube through said partition, and vertical radial partitions between the tube and hood forming chambers thereunder, substantially as described.

In testimony whereof I affix my signature in presence of two witnesses.

OLE OINES.

Witnesses:
ROBERT A. STORM,
W. M. HENNY.